(12) United States Patent
Gupta et al.

(10) Patent No.: US 12,087,286 B2
(45) Date of Patent: Sep. 10, 2024

(54) SCALABLE ENTITIES AND PATTERNS MINING PIPELINE TO IMPROVE AUTOMATIC SPEECH RECOGNITION

(71) Applicant: Microsoft Technology Licensing, LLC, Redmond, WA (US)

(72) Inventors: Ankur Gupta, Hyderabad (IN); Satarupa Guha, Kolkata (IN); Rupeshkumar Rasiklal Mehta, Hyderabad (IN); Issac John Alphonso, San Jose, CA (US); Anastasios Anastasakos, San Jose, CA (US); Shuangyu Chang, Davis, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 240 days.

(21) Appl. No.: 17/313,146

(22) Filed: May 6, 2021

(65) Prior Publication Data
US 2022/0358910 A1    Nov. 10, 2022

(51) Int. Cl.
*G10L 15/18*    (2013.01)
*G06F 16/332*    (2019.01)
(Continued)

(52) U.S. Cl.
CPC .......... *G10L 15/18* (2013.01); *G06F 16/3329* (2019.01); *G10L 15/22* (2013.01);
(Continued)

(58) Field of Classification Search
CPC ......... G10L 15/18; G10L 15/00; G10L 15/01; G10L 15/06; G10L 15/08; G10L 15/1815;
(Continued)

(56) References Cited

U.S. PATENT DOCUMENTS 10,672,379 B1 * 6/2020 Ellert .................... G06F 3/162
11,176,934 B1 * 11/2021 Venkatesh Raman ........................ G10L 15/32

(Continued)

OTHER PUBLICATIONS

"International Search Report and Written Opinion Issued in PCT Application No. PCT/US22/024144", Mailed Date: Sep. 16, 2022, 19 Pages.
"Invitation to Pay Additional Fees Issued in PCT Application No. PCT/US22/024144", Mailed Date: Jul. 26, 2022, 12 Pages.

*Primary Examiner* — Qi Han
(74) *Attorney, Agent, or Firm* — CALFEE, HALTER & GRISWOLD LLP

(57) ABSTRACT

A computing system obtains features that have been extracted from an acoustic signal, where the acoustic signal comprises spoken words uttered by a user. The computing system performs automatic speech recognition (ASR) based upon the features and a language model (LM) generated based upon expanded pattern data. The expanded pattern data includes a name of an entity and a search term, where the entity belongs to a segment identified in a knowledge base. The search term has been included in queries for entities belonging to the segment. The computing system identifies a sequence of words corresponding to the features based upon results of the ASR. The computing system transmits computer-readable text to a search engine, where the text includes the sequence of words.

20 Claims, 9 Drawing Sheets

(51) Int. Cl.
  *G10L 15/22* (2006.01)
  *G06N 5/022* (2023.01)
  *G10L 15/08* (2006.01)

(52) U.S. Cl.
  CPC ........ *G06N 5/022* (2013.01); *G10L 2015/081* (2013.01); *G10L 2015/088* (2013.01)

(58) Field of Classification Search
  CPC ... G10L 15/1822; G10L 15/183; G10L 15/19; G10L 15/193; G10L 15/197; G10L 15/22; G10L 15/26; G10L 15/28; G10L 2015/0631–0638; G10L 2015/221–228
  USPC ....... 704/231, 235, 243, 245, 250, 251, 255, 704/257
  See application file for complete search history.

(56) References Cited

U.S. PATENT DOCUMENTS

| | | |
|---|---|---|
| 2008/0091412 A1 | 4/2008 | Strope et al. |
| 2008/0221879 A1 | 9/2008 | Cerra et al. |
| 2013/0346077 A1* | 12/2013 | Mengibar ............. G06F 16/211 704/235 |
| 2014/0358544 A1* | 12/2014 | Printz ..................... G10L 15/32 704/254 |
| 2015/0019216 A1 | 1/2015 | Singh et al. |
| 2015/0332670 A1 | 11/2015 | Hakkani-Tur |
| 2015/0340024 A1 | 11/2015 | Schogol et al. |
| 2021/0035569 A1* | 2/2021 | Holm ....................... G10L 15/02 |
| 2021/0248996 A1* | 8/2021 | Itoh ......................... G06F 40/56 |

* cited by examiner

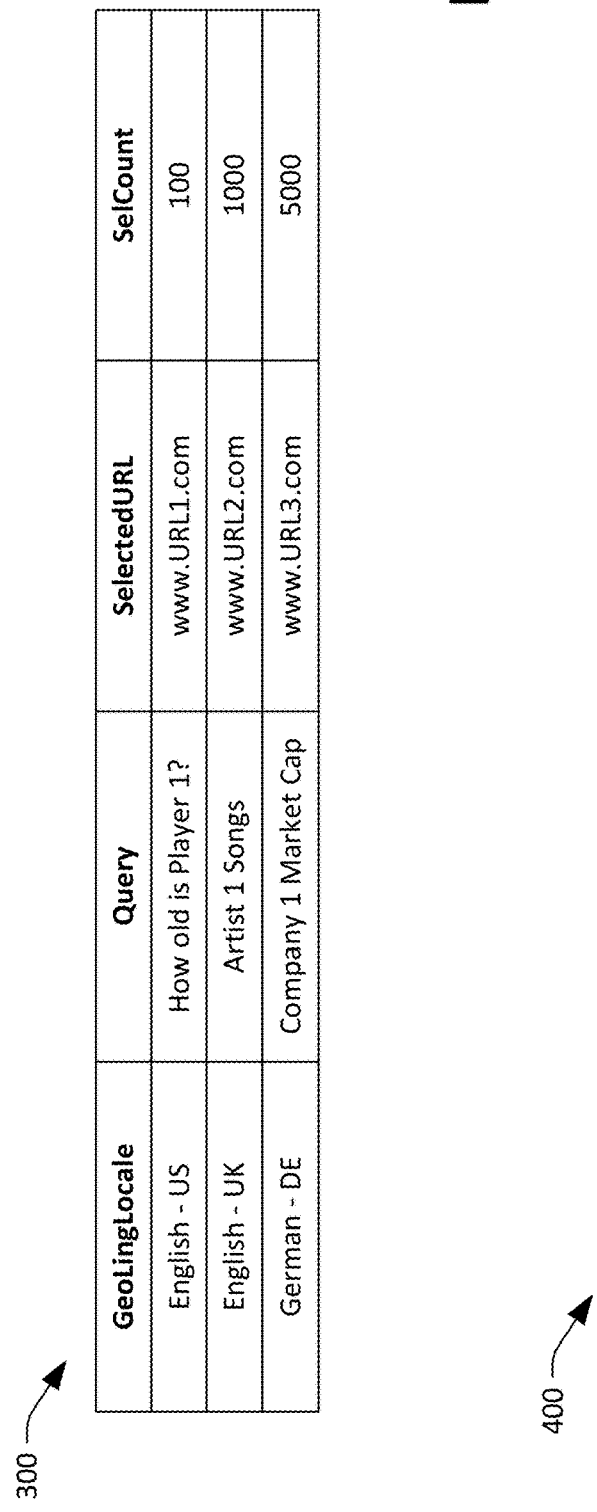

FIG. 3

| GeoLingLocale | Query | SelectedURL | SelCount |
|---|---|---|---|
| English - US | How old is Player 1? | www.URL1.com | 100 |
| English - UK | Artist 1 Songs | www.URL2.com | 1000 |
| German - DE | Company 1 Market Cap | www.URL3.com | 5000 |

| EntityID | EntityName | EntitySegment | EntityType | SourceURL |
|---|---|---|---|---|
| Unique ID 1 | Player 1 | Athlete | Football Player | www.URL1.com |
| Unique ID 2 | Artist 1 | Artist | Jazz Artist | www.URL2.com |
| Unique ID 3 | Company 1 | Company | BioTech Company | www.URL3.com |

400

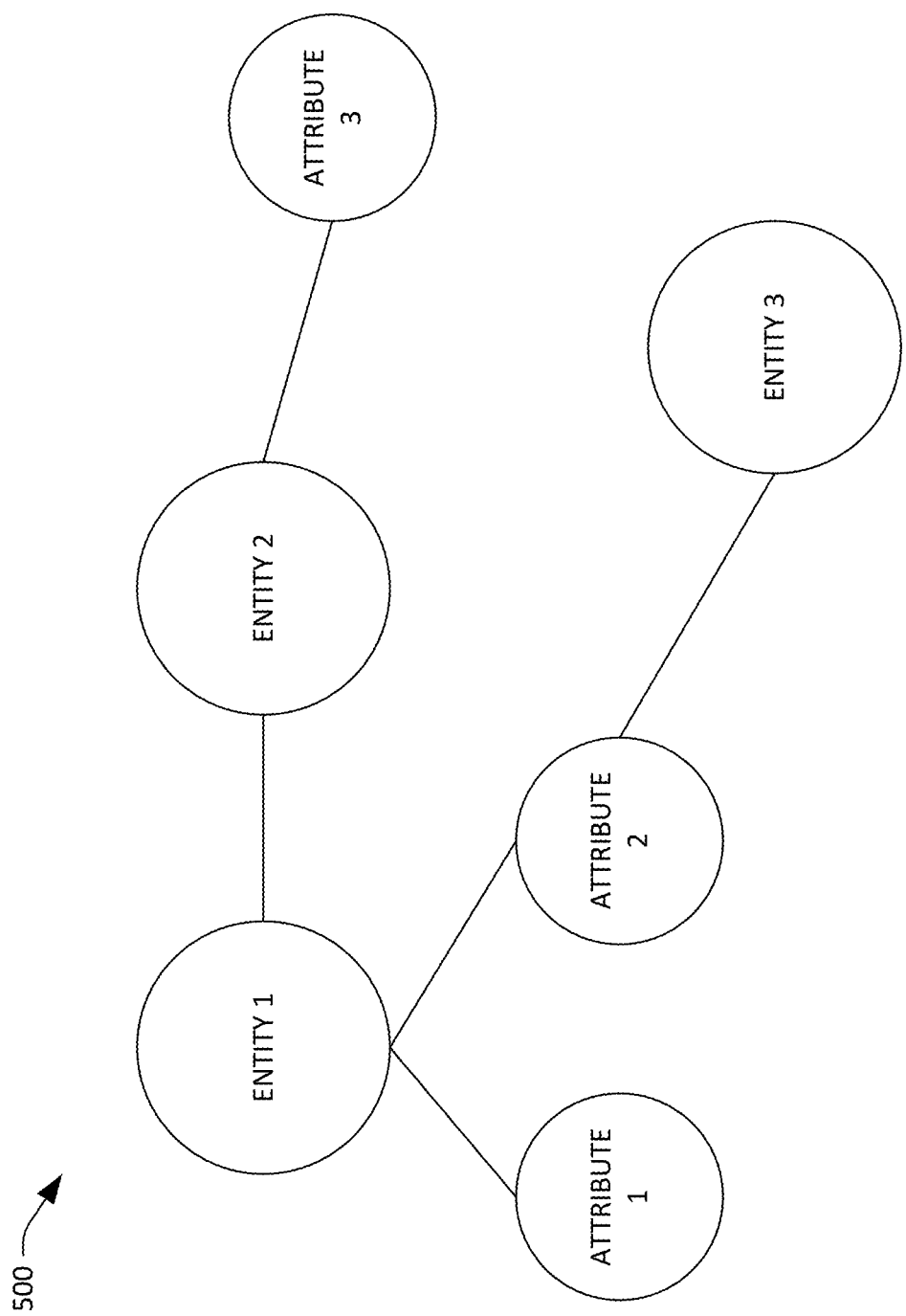

| GeoLingLocale | Query | EntityID | EntityName | EntitySegment | EntityType | SelCount |
|---|---|---|---|---|---|---|
| English - US | How old is Player 1? | Unique ID 1 | Player 1 | Athlete | Football Player | 100 |
| English - UK | Artist 1 Songs | Unique ID 2 | Artist 1 | Artist | Jazz Artist | 1000 |
| German - DE | Company 1 Market Cap | Unique ID 3 | Company 1 | Company | BioTech Company | 5000 |

| GeoLingLocale | EntityID | EntityName | EntitySegment | EntityType | EntityImpression |
|---|---|---|---|---|---|
| English - US | Unique ID 1 | Player 1 | Athlete | Football Player | 1000 |
| English - UK | Unique ID 2 | Artist 1 | Artist | Jazz Artist | 10000 |
| German - DE | Unique ID 3 | Company 1 | Company | BioTech Company | 50000 |

| GeoLingLocale | EntitySegment | Pattern | EntityType | PatternImpression |
|---|---|---|---|---|
| English - US | Athlete | <e> old | Football Player | 10000 |
| English - UK | Artist | <e> songs | Jazz Artist | 100000 |
| German - DE | Company | <e> market cap | BioTech Company | 500000 |

FIG. 8

SCALABLE ENTITIES AND PATTERNS MINING PIPELINE TO IMPROVE AUTOMATIC SPEECH RECOGNITION

BACKGROUND

Automatic speech recognition (ASR) technologies convert spoken words uttered by a user into computer-readable text. With more particularity, ASR technologies find a most likely sequence of words given a sequence of acoustic feature vectors (the acoustic feature vectors being based upon the spoken words uttered by the user) and output computer-readable text that includes the most likely sequence of words. The computer-readable text may then be used for a variety of purposes. In an example, the computer-readable text is provided to a search engine (which utilizes the computer-readable text as a query), where the search engine returns search results based upon the text.

An ASR computing system utilizes an acoustic model (AM), a lexicon (also referred to as a pronunciation model), and a language model (LM) in order to convert spoken words into computer-readable text. The AM represents the relationship between an acoustic feature vector and speech units that make up speech. The lexicon captures pronunciation modeling, which describes how a sequence of speech units (e.g., phones) are used to represent larger speech units such as words or phrases. The LM is generally configured to output probabilities of sequences of words.

Conventionally, a computing system may mine data from specific websites in order to generate a LM. However, this approach is computationally burdensome and hard to scale across different locales in which people speak different languages or different variations of the same language (e.g., English—United States, English—United Kingdom, German—Germany, etc.). Furthermore, mining data from specific websites tends to underperform with respect to capturing relative importance of entities.

SUMMARY

The following is a brief summary of subject matter that is described in greater detail herein. This summary is not intended to be limiting as to the scope of the claims.

An improved automatic speech recognition (ASR) computing system is described herein. The improved ASR computing system utilizes language models (LMs) that have been generated based upon search engine logs and a knowledge base, where the knowledge base has been extracted from a knowledge graph. With more particularity, the improved ASR computing system generates the LMs based upon expanded pattern data derived from the search engine logs and the knowledge base, where the expanded pattern data includes a name of an entity (e.g., a person, place, thing, idea, etc.) and at least one search term, where the entity belongs to a segment identified in the knowledge base, where the at least one search term has been included in queries for entities stored in the search engine logs, and where each of the entities belongs to the segment. The improved ASR computing system scales across different geo-linguistic locales having persons speaking different languages or different dialects of the same language (e.g., English—United States, English—United Kingdom, German—Germany, etc.).

To generate the expanded pattern data, a computing system accesses a search engine log and an entry in the knowledge base. The search engine log includes a query including a name of the entity and a search term, an identifier for a geo-linguistic locale, and a uniform resource locator (URL) that was selected in search results for the query. The entry in the knowledge base includes the name of the entity, a segment of the entity (a high-level categorization of the entity), a type of the entity (a granular categorization of the entity), and a URL from which the entry in the knowledge base was derived. The computing system generates a query stream based upon the URL in the search engine log matching the URL in the entry in the knowledge base, where the query stream includes the query, the identifier for a geo-linguistic locale, the name of an entity, the segment of the entity, and the type of the entity. The computing system generates an entity stream based upon the query stream, where the entity stream includes the identifier for the geo-linguistic locale, the segment of the entity, and the type of the entity. The computing system generates a pattern stream based upon the query stream, where the pattern stream includes the identifier for the geo-linguistic locale, a pattern, the segment, and the type. The computing system identifies a pattern based upon the query stream by replacing the name of the entity in the query with a pattern placeholder (referred to herein by "<e>"). The computing system generates the expanded pattern data by selecting an entry in the pattern stream, selecting an entry in the entity stream based upon the segment or the type in the pattern stream matching the segment or the type in the entity stream, and replacing the pattern placeholder with the name of the entity in the entity stream.

The computing system generates first pass LMs and a second pass LM based upon the expanded pattern data, where the first pass LMs are configured to output a list of word sequences and probabilities and where the second LM is configured to revise the probabilities. According to embodiments, the first pass LMs include a unified language model (ULM), a time sensitive language model (TSLM), and a class-based language model (CLM). According to embodiments, the first pass LMs are n-gram language models and the second pass LM is a neural network.

In example operation, the ASR computing system obtains features that have been extracted from an acoustic signal, where the acoustic signal is indicative of words spoken by a user. The words spoken by the user may be a query that the user intends to submit to a search engine. The ASR computing system performs ASR based upon the acoustic features, an AM, a lexicon, and the LMs described above. The ASR computing system identifies a most likely sequence of words corresponding to the features based upon results of the ASR. The ASR computing system outputs computer-readable text that includes the most likely sequence of words. In an example, the ASR computing system transmits the computer-readable text to the search engine. The search engine performs a search based upon the computer-readable text, and causes a computing device operated by the user to receive search results for the search, where the computing device presents the search results to the user.

The above-described technologies present various advantages over conventional techniques for generating LMs. First, unlike certain conventional approaches for generating LMs, the above-described technologies do not rely upon mining data from a specific website. Second, via the first pass LMs and the second pass LM (which are generated based upon expanded pattern data from search engine logs and a knowledge base), the above-described technologies are suitable for quick domain adaption to support new applications that are entity rich. Third, as patterns for a particular segment/type of entity tend to change infrequently, the LMs described above can be maintained and updated with minimal human intervention. Fourth, since the above-described technologies handle multiple geo-linguistic locales in a unified manner, regional entities (e.g., a song like "Gangnam Style") may be captured in a particular geo-linguistic locale before they start to trend internationally across different geo-linguistic locales.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 illustrates example search logs.

FIG. 4 illustrates example entries in a knowledge base.

FIG. 5 illustrates an example knowledge graph.

FIG. 6 illustrates an example query stream.

FIG. 7 illustrates an example entity stream.

FIG. 8 illustrates an example pattern stream.

Figure 1:
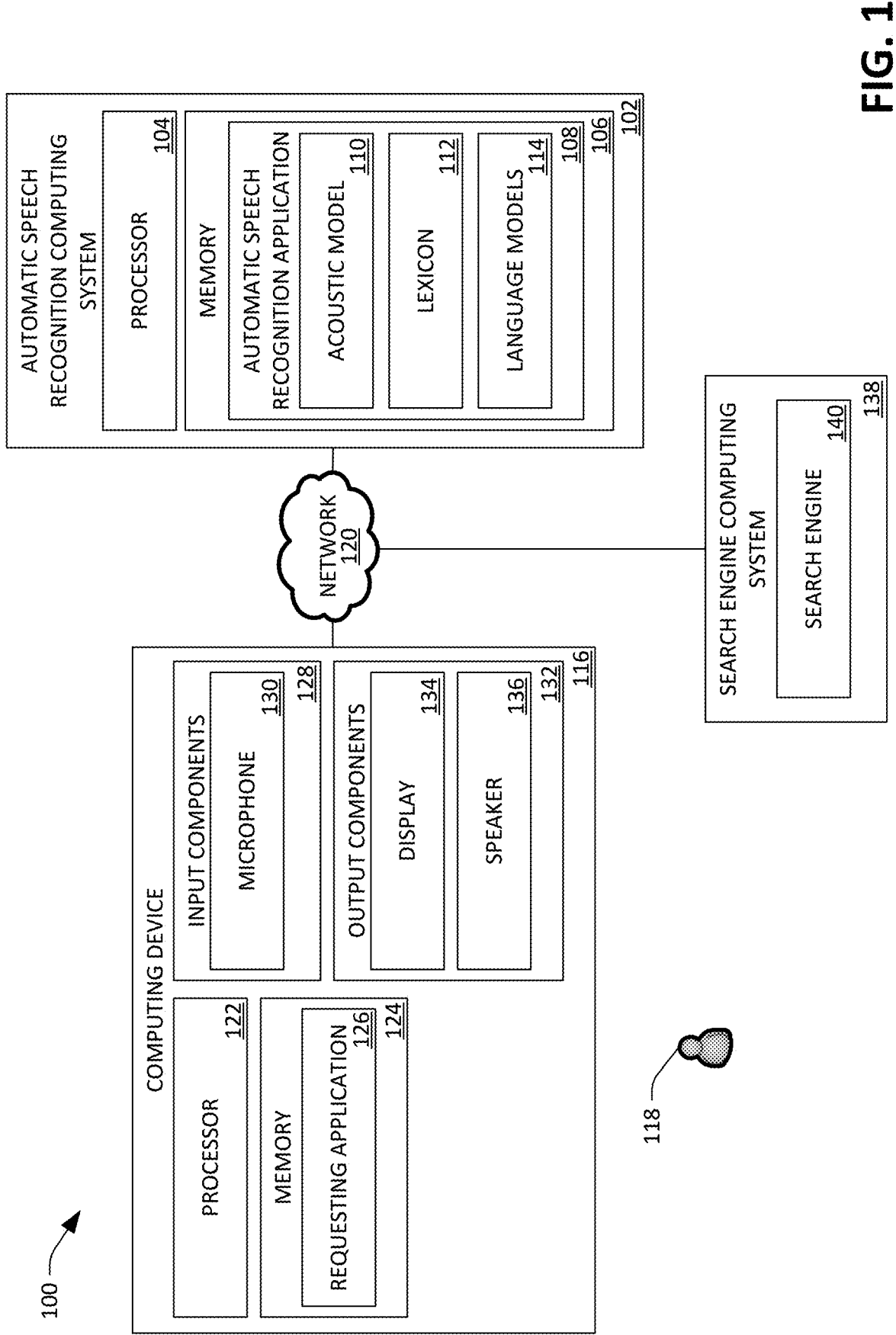
FIG. 1 is a functional block diagram of an example computing environment that facilitates automatic speech recognition (ASR).

Various technologies pertaining to generation of a language model (LM) based upon search engine logs and a knowledge base, where the LM is used in automatic speech recognition (ASR), are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, computer-implemented ASR systems employ LMs to recognize sequences of words in spoken utterances, where a LM models word sequence probabilities. Conventionally, LMs are constructed by extracting text from pre-specified webpages, such as online encyclopedias. This approach is problematic however, because someone must first identify such web pages, ensure that the language used therein corresponds to a dialect desired for the LM, etc.

Described herein are technologies relating to constructing of LMs of computer-implemented ASR systems based upon content of a search engine log, where the search engine log includes data that identifies a geo-linguistic locale (e.g., English—United States, English—United Kingdom, German—Germany, etc.) of webpages from which the text is extracted to construct a LM. This approach improves upon conventional technologies for constructing LMs, as geo-linguistic locales of webpages from which text is extracted for construction of LMs can be automatically ascertained. In additional, the approach for constructing LMs herein allows for inclusion of relatively new or "trending" entities in the LMs, since webpages from which the text is extracted are identified based upon real-world user behavior as evidenced in the search engine log.

Briefly, in connection with constructing a LM for a geo-linguistic locale, the following operations are performed. A computing system accesses search engine logs of a search engine. An example search engine log includes: a query that includes a name of an entity and at least one search term, an identifier for a geo-linguistic locale in which the query originated, a uniform resource locator (URL) that was selected by an individual after search results for the query were presented to the individual (referred to herein as a "selected URL"), and a selection count, where the selection count is a number of times in which the URL was selected by all individuals in the geo-linguistic locale for the query.

The computing system also accesses a knowledge base, where the knowledge base has been extracted from a knowledge graph. The knowledge graph includes nodes and edges that connect subsets of the nodes to one another, where each node represents either an entity or an attribute. An example entry in the knowledge base includes a unique identifier for an entity, a name of the entity, a segment of the entity, a type of the entity, and a source URL from which the entry in the knowledge base was derived. The segment represents a "high-level" category of the entity, whereas the type of the entity represents a sub-category within the high-level category.

The computing system generates a query stream based upon the search engine logs and the knowledge base. With more particularity, the computing system joins entries in the search engine logs with entries in the knowledge base based upon selected URLs of the search engine logs matching source URLs in the knowledge base entries. An example entry in the query stream includes a query, an identifier for a geo-linguistic locale in which the query originated, a unique identifier for the entity, a name of the entity, a segment of the entity, a type of the entity, and a selection count.

The computing system generates an entity stream based upon the query stream. An example entry in the entity stream includes the identifier for the geo-linguistic locale, the unique identifier for an entity, the name of the entity, the segment of the entity, the type of the entity, and an entity impression for the entity, where the entity impression is a number. The computing system computes the entity impression by selecting entries in the query stream that have the same unique identifier for the entity and the same identifier for the geo-linguistic locale and summing the selection count of each of the entries.

The computing system also generates a pattern stream based upon the query stream. The computing system selects an entry in the query stream, which as noted above, includes the query and the name of the entity. The query includes the name of the entity and at least one search term. The computing system generates a pattern by replacing the name of the entity in the query with a pattern placeholder. An example entry in the pattern stream includes the identifier for a geo-linguistic locale, the segment, the pattern, the type, and a pattern impression, where the pattern impression is a number. The computing system computes the pattern impression as follows. First, the computing system generates a partial pattern stream for each entry in the query stream by extracting the identifier for a geo-linguistic locale, the segment of the entity, the pattern of the entity, and the type of the entity from the query stream. Second, the computing system computes the pattern impression as a number of times the pattern occurs in the partial pattern stream for a given segment/type in a given geo-linguistic locale.

The computing system generates first pass LMs and a second pass LM based upon the entity stream and the pattern stream. According to embodiments, the first pass LMs are n-gram LMs and the second pass LM is a deep neural network. The first pass LMs include a unified language model (ULM), a time-sensitive language model (TSLM), and a class-based language model (CLM). The first pass LMs and the second pass LM are described in greater detail below.

In operation, the computing system obtains features that have been extracted from an acoustic signal, where the acoustic signal is indicative of spoken words uttered by a user. The words spoken by the user may be a query that the user intends to submit to a search engine. The computing system performs ASR based upon the acoustic features, the AM, the lexicon, and the LMs described above. The computing system identifies a most likely sequence of words corresponding to the features based upon results of the ASR. The computing system outputs computer-readable text that includes the most likely sequence of words. In an example, the computing system transmits the computer-readable text to the search engine. The search engine performs a search based upon the computer-readable text, and causes the computing device operated by the user to receive search results for the search, where the computing device presents the search results to the user.

The above-described technologies present various advantages over conventional techniques for generating LMs. First, unlike certain conventional approaches for generating LMs, the above-described technologies do not rely upon mining data from a specific website. Second, via the first pass LMs and the second pass LM (which are generated based upon expanded pattern data from search engine logs and a knowledge base), the above-described technologies are suitable for quick domain adaption to support new applications that are entity rich. Third, as patterns for a particular segment/type of entity tend to change infrequently, the LMs described above can be maintained with minimal human intervention. Fourth, since the above-described technologies handle multiple geo-linguistic locales in a unified manner, regional entities (e.g., a song like "Gangnam Style") may be captured in particular geo-linguistic locale before they start to trend internationally across different geo-linguistic locales.

With reference to FIG. 1, an exemplary computing environment 100 that facilitates ASR is illustrated. The computing environment 100 includes an ASR computing system 102. According to some embodiments, the ASR computing system 102 is a cloud-based computing platform. The ASR computing system 102 includes a processor 104 and memory 106, where the memory 106 has an ASR application 108 loaded therein. The ASR application 108, when executed by the processor 104, is generally configured to identify a most likely sequence of words given features that have been extracted from an acoustic signal, where the acoustic signal is indicative of spoken words. The ASR application 108 includes an acoustic model (AM) 110, where the AM 110 represents the relationship between an acoustic feature vector and speech units that make up speech. The ASR application 108 includes a lexicon 112, where the lexicon 112 models a sequence of phones of a word. The ASR application 108 includes language models (LMs) 114 that are generally configured to output a list of word sequences and probabilities of the word sequences. The LMs 114 are described in greater detail below.

The computing environment 100 includes a computing device 116 that is operated by a user 118. The computing device 116 may be a desktop computing device, a laptop computing device, a tablet computing device, a smartphone, etc. The computing device 116 is in communication with the ASR computing system 102 by way of a network 120 (e.g., the Internet, intranet, etc.). The computing device 116 includes a processor 122 and memory 124, where the memory 124 has a requesting application 126 loaded therein. The requesting application 126, when executed by the processor 122, is generally configured to cause ASR to be performed based upon words uttered by the user 118. According to some embodiments, the requesting application 126 is a virtual assistant application that performs tasks or services for the user 118 based on commands or questions set forth by the user 118.

The computing device 116 includes input components 128 that enable the user 118 to set forth input to the computing device 116. The input components 128 include a microphone 130 that is configured to capture acoustic signals, where the acoustic signals are based upon spoken words of the user 118. The input components 128 may also include a keyboard, a touchscreen, a mouse, a scroll wheel, a trackpad, a camera, a video camera, etc. (not shown in FIG. 1). The computing device 116 includes output components 132 that enable the computing device 116 to output information to the user 118. The output components 132 include a display 134, whereupon graphical features may be presented thereon. The output components 132 further include a speaker 136 that is configured to emit audible sounds.

The computing environment 100 may further include a search engine computing system 138 that is in communication with the ASR computing system 102 and the computing device 116 by way of the network 120. The search engine computing system 138 includes a search engine 140. The search engine 140 is generally configured to search the world wide web based upon queries set forth to the computing device 116 by the user 118. The search engine 140 is also generally configured to return search results for the queries to the computing device 116 for presentment to the user 118.

Figure 2:
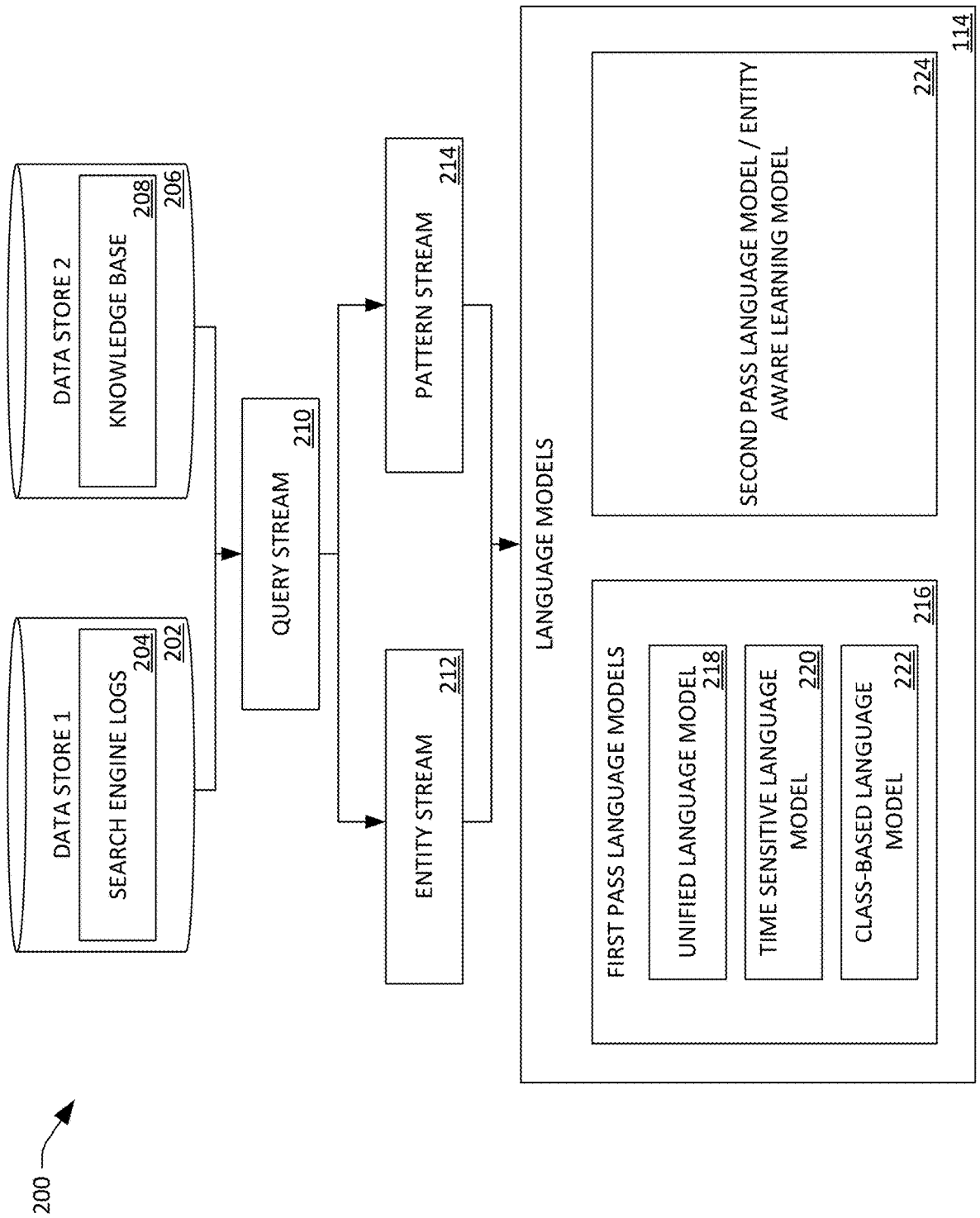
FIG. 2 illustrates a process flow for generating language models (LMs).

Referring now to FIG. 2, a process flow 200 for generating the LMs 114 is illustrated. For ease of explanation, the process flow 200 will be described below as being performed by the ASR computing system 102; however, it is to be understood that a computing system separate from the ASR computing system 102 may perform the process flow 200 to generate the LMs 114 and the LMs 114 may be subsequently incorporated into the ASR application 108 on the ASR computing system 102.

The ASR computing system 102 accesses a first data store 202, where the first data store 202 stores search engine logs 204. In an example, the search engine logs 204 may be for the search engine 140. An entry in the search engine logs 204 includes an identifier for a geo-linguistic locale (an identifier for a language and an identifier for a geographic region in which the language is used), a query that originated from a device in the geo-linguistic locale and that was previously provided to the search engine 140 (or another search engine), a uniform resource locator (URL) that was selected (e.g., clicked) by an individual in search results for the query (referred to herein as a "selected URL"), and a selection count, where the selection count is a number of times the URL was selected by all individuals in the geo-linguistic locale within a certain time period (e.g., one year) for the query. The query includes a name of an entity and at least one search term. The entry in the search engine logs 204 may also include a datetime (a date and a time) at which the query was received.

Referring briefly to FIG. 3, example search engine logs 300 are illustrated. The search engine logs 300 may be or include the search engine logs 204 or the search engine logs 204 may be or include the search engine logs 300. As illustrated in FIG. 3, a first entry in the search engine logs 300 includes "English—UK" (an identifier for a geo-linguistic locale), "How old is Player 1" (a query), "www.URL1.com" (a selected URL), and "100" (a selection count). Although not depicted in FIG. 3, it is to be understood that the entry in the search engine logs 300 may also include a datetime at which the query was received.

Referring back to FIG. 2, the ASR computing system 102 also accesses a second data store 206, where the second data store 206 stores a knowledge base 208. An entry in the knowledge base 208 includes a unique identifier for an entity, a name of the entity, a segment of the entity, a type of the entity, and a source URL. In an example, the entity is a person, place, thing, organization, or an idea. The segment of the entity categorizes the entity. The type of the entity categorizes the entity within the segment. The source URL is a URL from which the entry in the knowledge base 208 was derived. It is to be understood that the entity may belong to more than one segment and/or may have more than one type, and as such, an entry for an entity in the knowledge base may include more than one segment and/or more than one type.

Referring briefly to FIG. 4, an example knowledge base 400 is illustrated. The knowledge base 400 may be or include the knowledge base 208 or the knowledge base 208 may be or include the knowledge base 400. As illustrated in FIG. 4, a first entry in the knowledge base 400 includes "Unique ID 1" (a unique identifier for an entity), "Player 1" (a name of the entity), "Athlete" (a segment of the entity), "Football Player" (a type of the entity), and "www.URL1.com" (a source URL).

According to some embodiments, the knowledge base 208 is generated based upon a knowledge graph. Turning to FIG. 5, an example knowledge graph 500 is illustrated. The knowledge graph 500 includes nodes (indicated by circles in FIG. 5), where each node represents an entity or an attribute of an entity. A node representing an entity may include or reference information pertaining to the entity. In an example, the node may include or reference a unique identifier for the entity, a segment of the entity, a type of the entity, and a source URL from which the segment of the entity and the type of the entity were determined. Some of the nodes in the knowledge graph 500 are connected by one or more edges (indicated by lines in FIG. 5). An edge is assigned criteria that is indicative of a relationship between nodes the edge connects. In an example where Entity 1 is Player 1 who plays for Team 1 and Entity 2 is Team 1, the edge connecting the node representing Entity 1 to the node representing entity 2 is assigned criteria indicative of "plays for". In another example where Attribute 1 is "American" and where Player 1 is of American nationality, the edge connecting the node representing Entity 1 to the node representing Attribute 1 is assigned criteria indicative of "nationality".

Referring back to FIG. 2, the ASR computing system 102 generates a query stream 210 based upon the search engine logs 204 and the knowledge base 208, where the query stream 210 is retained in the memory 106. With more specificity, the ASR computing system 102 generates the query stream 210 by joining entries in the search engine logs 204 with entries in the knowledge base 208 based upon the selected URL in the search engine logs 204 matching the source URL in the entries in the knowledge base 208. An entry in the query stream 210 includes the identifier for the geo-linguistic locale, the query, the unique identifier for the entity, the name of the entity, the segment of the entity, the type of the entity, and the selection count. The entry in the query stream 210 may also include the datetime at which the query was received.

Turning now to FIG. 6, an example query stream 600 is illustrated. The query stream 600 may be or include the query stream 210 or the query stream 210 may be or include the query stream 600. As illustrated in FIG. 6, a first entry in the query stream 600 includes "English—US" (an identifier for a geo-linguistic locale), "How old is player 1" (a query), "Unique ID 1" (a unique identifier for an entity), "Player 1" (a name of the entity), "Athlete" (a segment of the entity), "Football Player" (a type of the entity), and "100" (a selection count).

Turning back to FIG. 2, the ASR computing system 102 generates an entity stream 212 based upon the query stream 210, where the entity stream 212 is stored in the memory 106. With more specificity, the ASR computing system 102 generates the entity stream 212 by aggregating over the geo-linguistic locales and unique identifiers for entities. An entry in the entity stream 212 includes the identifier for the geo-linguistic locale, the unique identifier for the entity, the name of the entity, the segment of the entity, the type of the entity, and the entity impression. The ASR computing system 102 computes the entity impression by selecting entries in the query stream 210 that have the same unique identifier for the entity and the same identifier for the geo-linguistic locale and summing the selection count of each of the entries. The ASR computing system 102 may filter (remove) entries in the entity stream 212 that have an entity impression that falls below a threshold value.

Turing briefly to FIG. 7, an example entity stream 700 is illustrated. The entity stream 700 may be or include the entity stream 212 or the entity stream 212 may be or include the entity stream 700. As illustrated in FIG. 7, a first entry in the entity stream 700 includes "English—US" (an identifier for a geo-linguistic locale), "Unique ID 1" (a unique identifier for an entity), "Player 1" (a name of the entity), "Athlete" (a segment of the entity), "Football Player" (a type of the entity), and "1000" (an entity impression).

Turning back to FIG. 2, the ASR computing system 102 also generates a pattern stream 214 based upon the query stream 210, where the pattern stream 214 is stored in the memory 106. An entry in the pattern stream 214 includes the identifier for the geo-linguistic locale, the segment, the pattern, the type, and the pattern impression. As a preliminary step in generating the pattern stream 214, the ASR computing system 102 may filter entries in the query stream 210 that have a selection count below a threshold value. The ASR computing system 102 selects an entry in the query stream 210. The entry in the query stream 210 includes the query and the name of the entity. Furthermore, the query includes the name of the entity and at least one search term. The ASR computing system 102 generates a pattern by replacing the name of the entity in the query with a pattern placeholder. The ASR computing system 102 computes the pattern impression as follows. First, the ASR computing system 102 generates a partial pattern stream for each entry in the query stream 210 by extracting the identifier for the geo-linguistic locale, the segment of the entity, the pattern of the entity, and the type of the entity from the query stream 210. Second, the ASR computing system 102 computes the pattern impression as a number of times the pattern occurs in the partial pattern stream for a given segment/type in a given geo-linguistic locale. The ASR computing system 102 may filter entries in the pattern stream that have a pattern impression that falls below a threshold value.

Turning now to FIG. 8, an example pattern stream 800 is illustrated. The pattern stream 800 may be or include the pattern stream 214 or the pattern extraction 214 may be or include the pattern stream 800. As illustrated in FIG. 8, a first entry in the pattern stream 800 includes "English—US" (an identifier for a geo-linguistic locale), "Athlete" (a segment), "<e> old" (a pattern, where "<e>" is a placeholder and "old" is a search term), "Football Player" (a type), and "10000" (a pattern impression).

According to some embodiments, the ASR computing system 102 may generate a first pattern stream and a second pattern stream, where the first pattern stream includes patterns identified based upon segments and where the second pattern stream includes patterns based upon types.

According to some embodiments, the ASR computing system 102 may filter entries from the pattern stream 214 based upon additional criteria. In a first example, the ASR computing system 102 determines a number of entities that are "covered" by a pattern. With more particularity, the ASR computing system 102 accesses an entry in the pattern stream 214. The entry in the pattern stream 214 includes a pattern and a segment/type. The ASR computing system 102 searches the entity stream 212 based upon the segment/type. The ASR computing system 102 calculates the number of entities covered by the pattern as a number of entries in the entity stream 212 that include the segment/type. The ASR computing system 102 filters patterns in the pattern stream 214 that cover less than a threshold amount of entities (e.g., 10). Patterns filtered in this manner include patterns derived from queries that are particular to a particular entity and that do not generalize well to different entities. In a second example, the ASR computing system 102 computes a maximum number of entities covered by any pattern (from amongst a plurality of patterns) for a given geo-linguistic locale and segment. The ASR computing system 102 then computes a ratio to max percentage, where the ratio to max percentage is the number of entities covered by a pattern multiplied by 100% and divided by the maximum number of entities covered by any pattern. The ASR computing system 102 filters patterns in the pattern stream 214 that have a ratio to max percentage of less than a threshold percentage (e.g., 10%).

According to some embodiments, the ASR computing system 102 may share patterns based across different geo-linguistic locales. In an example, patterns from the "English—United States" geo-linguistic locale are shared with patterns from the "English—United Kingdom" geo-linguistic locale.

Turning back to FIG. 2, the ASR computing system 102 generates the LMs 114 based upon the entity stream 212 and the pattern stream 214. The LMs 114 include first pass LMs 216. According to some embodiments, the first pass LMs 216 are n-gram models, where n is a positive integer. In an example, n is 1, 2, 3, 4, or 5. In general, an n-gram LM is configured to approximate a probability of a word (or words) given n−1 previous words.

The first pass LMs 216 include a unified language model (ULM) 218. The ASR computing system 102 generates the ULM 218 by expanding patterns in the pattern stream 214 for entities in the entity stream 212. With more particularity, the entity stream 212 includes an entry that includes a name of an entity and a segment of the entity, while the pattern stream 214 includes an entry that includes the segment and a pattern (or patterns) associated with the segment. The ASR computing system 102 matches the entry in the entity stream 212 with the entry in the pattern stream 214 based upon the segment found in each stream. Upon matching the two entries, the ASR computing system 102 extracts the pattern from the entry in the pattern stream 214, where the pattern includes a pattern placeholder and at least one search term. The ASR computing system 102 replaces the pattern placeholder of the pattern with the name of the entity in the entry in the entity stream 212 to generate expanded pattern data, where the expanded pattern data includes the name of the entity and the at least one search term. In an example, the entity stream 212 includes an entry that includes "Player 1" (a name of the entity) and "Athlete" (a segment of the entity). The pattern stream 214 includes an entry with "Athlete" (the segment of the entity) and two patterns: "<e> age" and "<e> salary", where <e> is a pattern placeholder. The ASR computing system 102 replaces "<e>" with "Player 1" to generate the following expanded pattern data: "Player 1 age" and "Player 1 salary". The ASR computing system 102 may also perform similar operations based on the type of the entity. In an example, an entry in the entity stream 212 includes "football player" (a type of the entity) and an entry in the pattern stream 214 for "football player" includes "<e> position". The ASR computing system 102 generates the following expanded data: "Player 1 position".

The expanded pattern data forms a ULM corpus. The ASR computing system 102 generates the ULM 218 (e.g., one or more n-gram models) based upon the ULM corpus. It is to be understood that the ASR computing system 102 may cause multiple instances of the same expanded pattern data to be included in the ULM corpus based upon the entity impression and/or the pattern impression described above. According to embodiments, the corpus may be supplemented with data from additional sources, such as online encyclopedias, news websites, etc. It is also to be understood that the ULM 218 may include different n-gram models (e.g., a bi-gram model and a tri-gram model) and that the ASR computing system 102 may interpolate between outputs of the different n-gram models.

The first pass LMs 216 also include a time sensitive language model (TSLM) 220. The ASR computing system 102 generates the TSLM 220 in a manner similar to ULM 218 (e.g., by expanding patterns in the pattern stream 214 for entities in the entity stream 212); however, the TSLM 220 includes several differences from the ULM 218. First, in order to generate the TSLM 220, the ASR computing system 102 filters entries in the query stream 210 that have not occurred within a time window from a current datetime (e.g., within 24 hours from the current datetime, within 12 hours from the current datetime, within 1 hour from the current datetime, etc.). As such, a filtered version of the entity stream 212 and the pattern stream 214 reflect current entities/patterns that are being searched for by individuals within the time window. The ASR computing system 102 generates the expanded pattern data based upon the filtered version of the entity stream 212 and the pattern stream 214, which forms a TSLM corpus. The ASR computing system 102 generates the TSLM 220 based upon the TSLM corpus. A size of the TSLM corpus is smaller than a size of the ULM corpus due to the TSLM corpus reflecting only entities/patterns that have been searched for within the time window. It is contemplated that the TSLM corpus and the TSLM are updated periodically (e.g., once every 24 hours, once every 12 hours, once an hour, etc.). Thus, the TSLM 220 is configured to capture "trending" entities, such as new songs, new movies, etc. It is to be understood that the TSLM 220 may include different n-gram models (e.g., a bi-gram model and a tri-gram model) and that the ASR computing system 102 may interpolate between outputs of the different n-gram models.

The first pass LMs 216 include a class-based language model (CLM) 222. The ASR computing system 102 generates the CLM 222 in a manner similar to ULM 218 (e.g., by expanding patterns in the pattern stream 214 for entities in the entity stream 212); however, the CLM 222 includes several differences from the ULM 218. In the CLM 222, the expanded pattern data is replaced by class placeholders. For instance, when the expanded pattern data is "Player X salary", the computing system, via a class map that maps entities/attributes to difference classes, replaces "Player X salary" with "[Person] [money]", where [Person] and [money] are class placeholders. The ASR computing system 102 generates a CLM corpus based upon the expanded pattern data that has been replaced with class placeholders and generates the CLM 222 based upon the CLM corpus. It is to be understood that the CLM 222 may include different n-gram models (e.g., a bi-gram model and a tri-gram model) and that the ASR computing system 102 may interpolate between outputs of the different n-gram models.

According to embodiments, the ASR computing system 102 uses the entities (determined via the knowledge base 208) and frequencies of the entities (determined via the search engine logs 204) to build finite state machines (FSMs), where the FSMs constitute the classes in the CLM 222.

The first pass LMs 216 output a list of word sequences and probabilities of the word sequences, where a probability of a word sequence is indicative of a likelihood of the word sequence given a prior word (or words). According to some embodiments, outputs of each of the first pass LMs 216 described above are weighted, that is, a first list of word sequences and probabilities output by the ULM 218 are assigned a first weight, a second list of word sequences and probabilities output by the TSLM 220 are assigned a second weight, and a third list of word sequences and probabilities output by the CLM 222 are assigned a third weight. The ASR computing system 102 may interpolate between the (weighted) lists of word sequences and their associated probabilities to generate a first pass list of word sequences and probabilities.

The LMs 114 further include a second pass LM 224 (also referred to as an entity aware learning model). The ASR computing system 102 trains the second pass LM 224 based upon the entity stream 212 and the pattern stream 214. With more specificity, the ASR computing system 102 may train the second pass LM 224 based upon lists of word sequences and probabilities output by the first pass LMs 216. According to some embodiments, the second pass LM 224 includes a deep neural network. According to some embodiments, the second pass LM 224 is a recurrent neural network (RNN), a long short-term memory (LSTM) RNN, or a transformer. In general, the second pass LM 224 is configured to re-rank the first pass list of word sequences and probabilities. The second pass LM 224 utilizes the entity stream 212 and the pattern stream 214 for a joint learning task of predicting both entities and next tokens. The second pass LM 224 demonstrates a reduced word error rate (WER) over entity centric queries.

Operation of the computing environment 100 is now set forth. It is contemplated that the user 118 wishes to verbally set forth a query. The user 118 utters spoken words that are indicative of the query. The microphone 130 of the computing device 116 captures the spoken words in the form of an analog signal. According to some embodiments, the computing device 116 converts the analog signal to a digital signal and extracts features from the digital signal (e.g., Mel-frequency cepstral coefficients). According to other embodiments, the computing device 116 converts the analog signal to a digital signal and transmits the digital signal to the ASR application 108, where the ASR application 108 extracts the features from the digital signal. According to some embodiments, the requesting application 126 transmits the digital signal or the features to the ASR application 108. The ASR application 108 performs ASR based upon the features, the AM 110, the lexicon 112, and the LMs 114. The ASR application 108 identifies a most likely sequence of words corresponding to the features based upon results of the ASR. The ASR application 108 outputs computer-readable text, where the computer-readable text includes the most likely sequence of words.

According to some embodiments, the ASR application 108 transmits the computer-readable text to the search engine computing system 138, whereupon the search engine 140 utilizes the text as a query. The search engine 140 searches the world wide web based upon the query and generates search results (e.g., a list of URLs) for the search. The search engine 140 transmits the search results to the computing device 116, whereupon the computing device 116 presents the search results to the user 118. In an example, the computing device 116 presents the search results on the display 134. In another example, the computing device 116 outputs audible noises that are indicative of the search results through the speaker 136.

Although the above-described processes have been described as being performed primarily by the ASR computing system 102, other possibilities are contemplated. According to some embodiments, the ASR application 108 is loaded in the memory 124 of the computing device 124 such that ASR is performed on the computing device 116 (as opposed to the ASR computing system 102).

Figure 9:
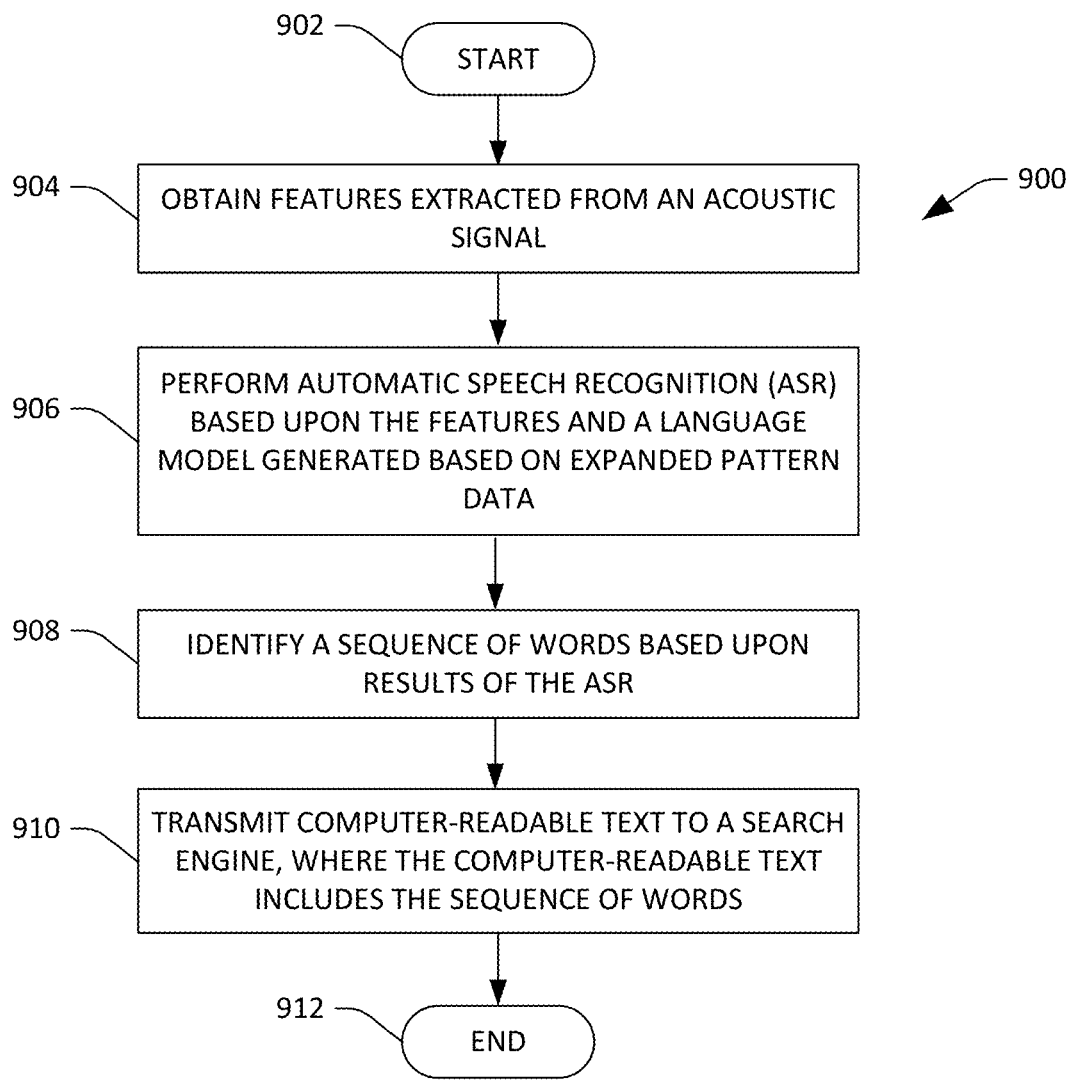
FIG. 9 is a flow diagram that illustrates an example methodology executed by a computing system for ASR.
Figure 10:
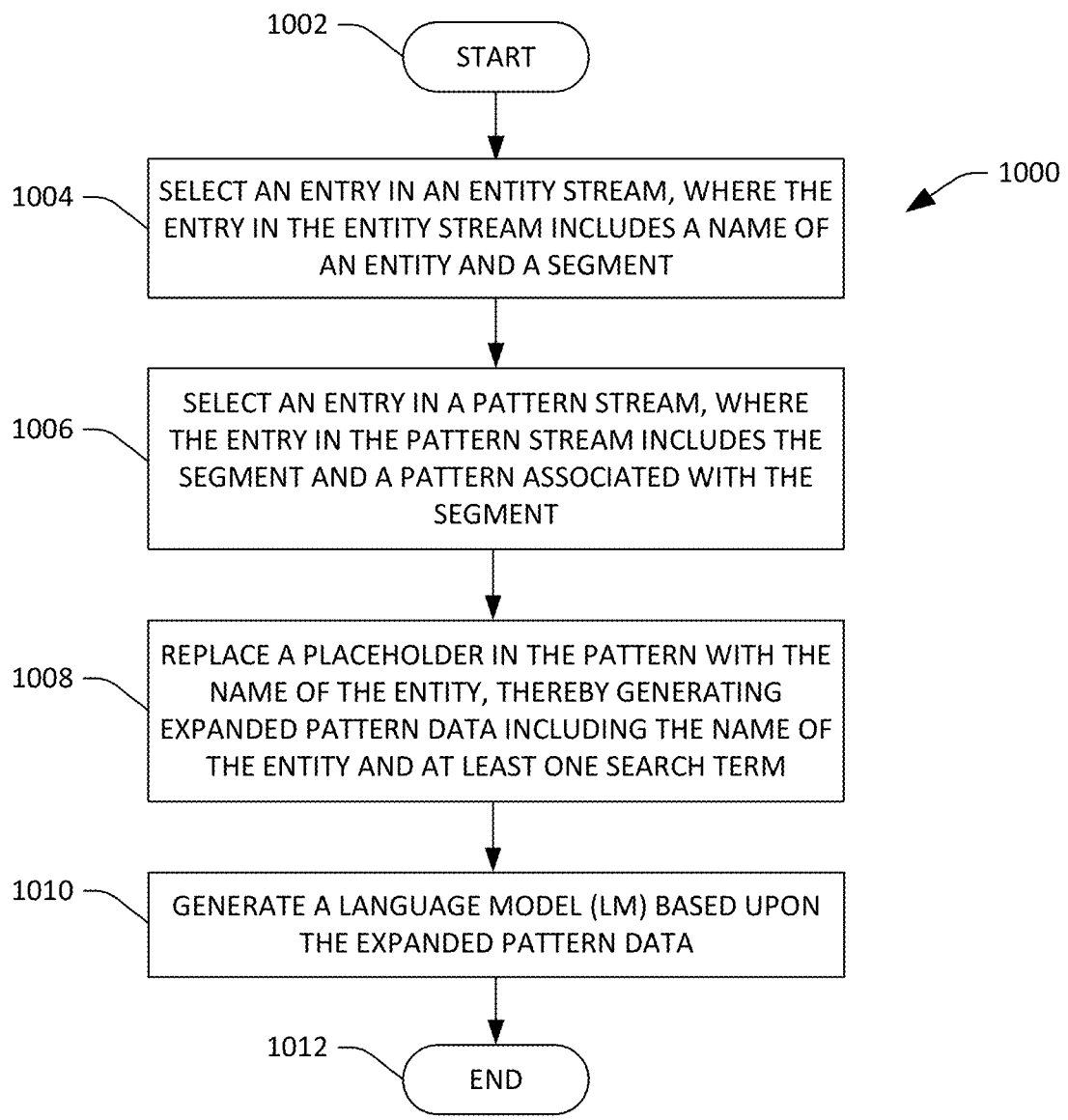
FIG. 10 is a flow diagram that illustrates an example methodology executed by a computing system that facilitates generation of a LM.

FIGS. 9 and 10 illustrate exemplary methodologies relating to ASR. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 9, a methodology 900 executed by a computing system that facilitates ASR is illustrated. The methodology 900 begins at 902, and at 904, the computing system obtains features that have been extracted from an acoustic signal. The acoustic signal is based upon spoken words uttered by a user. At 906, the computing system performs ASR based upon the features and a LM generated based upon expanded pattern data. The expanded pattern data includes a name of an entity and a search term. The entity belongs to a segment identified in a knowledge base, where the segment categories the entity. The search term has been included in queries for entities belonging to the segment. At 908, the computing system identifies a sequence of words based upon results of the ASR. At 910, the computing system transmits computer-readable text to a search engine, the text including the sequence of words. The methodology 900 concludes at 912.

Turning now to FIG. 10, a methodology executed by a computing system that facilitates generation of a LM is illustrated. The methodology 1000 begins at 1002, and at 1004, the computing system selects an entry in an entity stream, where the entry in the entity stream includes a name of an entity and a segment to which the entity belongs, where the segment categorizes the entity. At 1006, the computing system selects an entry in a pattern stream based upon the segment in the entity stream, where the entry in the pattern stream includes the segment and a pattern associated with the segment. The pattern includes a placeholder and at least one search term. At 1008, the computing system replaces the placeholder in the pattern with the name of the entity, thereby generating expanded pattern data. The expanded pattern data includes the name of the entity and the at least one search term. At 1010, the computing system generates a LM based upon the expanded pattern data. The methodology 1000 concludes at 1012.

Figure 11:
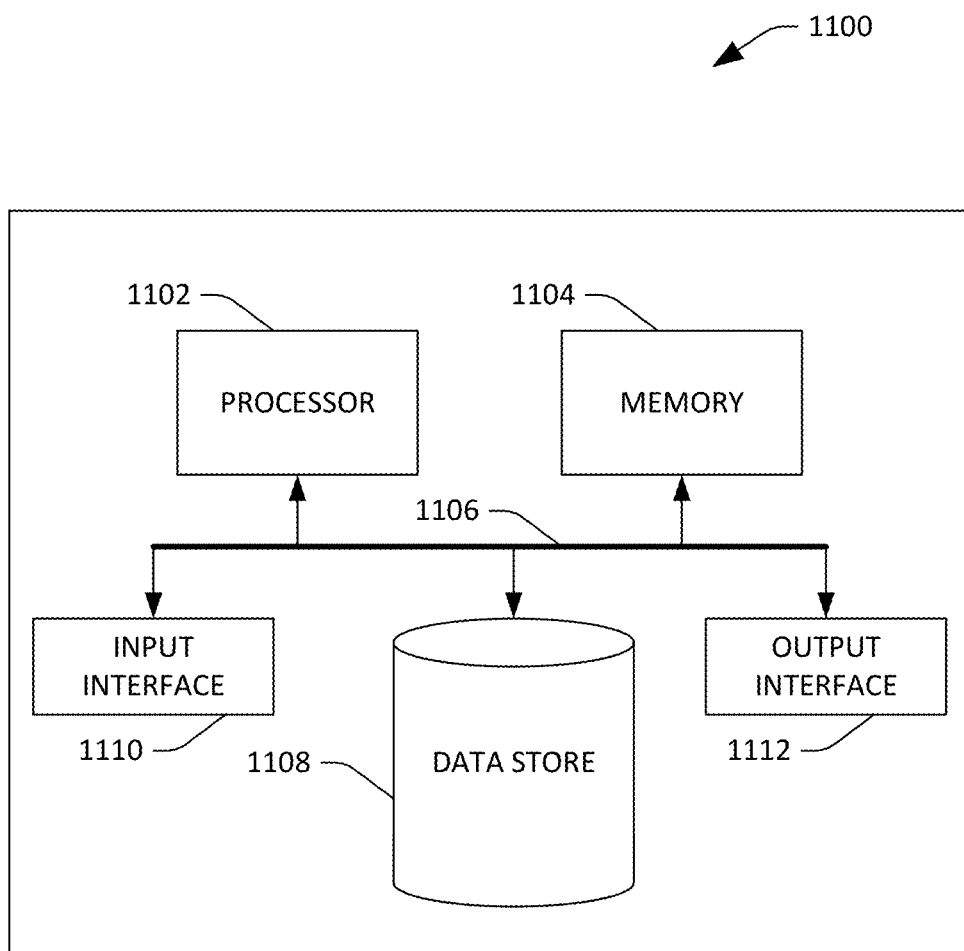
FIG. 11 illustrates an example computing device.

Referring now to FIG. 11, a high-level illustration of an exemplary computing device 1100 that can be used in accordance with the systems and methodologies disclosed herein is illustrated. For instance, the computing device 1100 may be used in a system that performs ASR. By way of another example, the computing device 1100 can be used in a system that generates a LM. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store acoustic models, lexicons, LMs, streams (e.g., query streams, entity streams, pattern streams, etc.), search engine logs, knowledge bases, knowledge graphs, etc.

The computing device 1100 additionally includes a data store 1108 that is accessible by the processor 1102 by way of the system bus 1106. The data store 1108 may include executable instructions, acoustic models, lexicons, LMs, streams (e.g., query streams, entity streams, pattern streams, etc.), search engine logs, knowledge bases, knowledge graphs, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FP- GAs), Application-specific Integrated Circuits (ASICs), Application-specific Standard Products (ASSPs), System-on-a-chip systems (SOCs), Complex Programmable Logic Devices (CPLDs), etc.

The present disclosure relates to generation of a LM based upon search engine logs and a knowledge base, where the LM is used in ASR, according to at least the examples provided in the section below:

(A1) In one aspect, some embodiments include a method (e.g., 900) executed by a processor (e.g., 104) of a computing system (e.g., 102). The method includes obtaining (e.g., 904) features that have been extracted from an acoustic signal, where the acoustic signal includes spoken words uttered by a user (e.g., 118). The method further includes performing (e.g., 906) automatic speech recognition (ASR) based upon the features and a language model (LM) (e.g., 114) generated based upon expanded pattern data. The expanded pattern data includes a name of an entity and a search term. The entity belongs to a segment identified in a knowledge base (e.g., 208), the segment categorizing the entity. The method additionally includes identifying (e.g., 908) a sequence of words based upon results of the ASR. The method also includes transmitting (e.g., 910) computer-readable text to a search engine (e.g., 140). The text includes the sequence of words.

(A2) In some embodiments of the method of A1, the expanded pattern data is generated by selecting a search engine log stored in search engine logs (e.g., 204). The search engine log includes a query that includes the name of the entity and at least one search term, an identifier for a geo-linguistic locale in which the query originated, a uniform resource locator (URL) that was selected in results for the query, and a selection count, where the selection count is a number of times the URL was selected by users in the geo-linguistic locale for the query. The expanded pattern data is further generated by identifying an entry in the knowledge base based upon the URL included in the search engine log. The entry in the knowledge base includes a unique identifier for the entity, the name of the entity, the segment of the entity which categorizes the entity, a type of the entity which categorizes the entity within the segment, and a second URL from which the entry in the knowledge base was generated, where the URL and the second URL are identical. The expanded pattern data is also generated by generating a query stream (e.g., 210) based upon the search engine log and the entry in the knowledge base. An entry in the query stream includes the query, the identifier for the geo-linguistic locale, the unique identifier for the entity, the name of the entity, the segment of the entity, the type of the entity, and the selection count.

(A3) In some embodiments of the method of A2, the expanded pattern data is further generated by generating an entity stream (e.g., 212) for the entity based upon the query stream. An entry in the entity stream includes the identifier for the geo-linguistic locale, the unique identifier for the entity, the name of the entity, the segment of the entity, the type of the entity, and an entity impression. The entity impression is computed by selecting entries in the query stream that have the unique identifier for the entity and the identifier for the geo-linguistic locale and summing respective selection counts for each of the entries in the query stream.

(A4) In some embodiments of any of the methods of A2-A3, the expanded pattern data is further generated by generating a pattern stream (e.g., 214) based upon the query stream. An entry in the pattern stream includes the identifier for the geo-linguistic locale, the segment of the entity, a pattern associated with entity, the type of the entity, and a pattern impression, where the pattern impression is indicative of a number of times the pattern was observed in queries associated with the segment.

(A5) In some embodiments of the method of A4, the pattern associated with the entity is determined by extracting the query from the entry in the query stream. The pattern associated with the entity is further determined by identifying the entity in the query based upon the name of the entity included in the entry in the query stream. The pattern associated with the entity is also determined by replacing the name of the entity in the query with a placeholder, where the pattern includes the placeholder and the at least one search term included in the query.

(A6) In some embodiments of the method of A5, the expanded pattern data is further generated by selecting the name of the entity and the segment of the entity in the entry in the entity stream, selecting the entry in the pattern stream based upon the segment of the entity included in the entity stream matching the segment of the entity included in the entry in the pattern stream, selecting the pattern in the entry in the pattern stream based upon the segment of the entity included in the entity stream, and replacing the placeholder in the pattern with the name of the entity in the entity stream, thereby generating the expanded pattern data.

(A7) In some embodiments of any of the methods of A5-A6, the expanded pattern data is further generated by selecting the name of the entity and the type of the entity in the entry in the entity stream, selecting the entry in the pattern stream based upon the type of the entity included in the entity stream matching the type of the entity included in the entry in the pattern stream, selecting the pattern in the entry in the pattern stream based upon the type of the entity included in the entity stream, and replacing the placeholder in the pattern with the name of the entity in the entity stream, thereby generating the expanded pattern data.

(A8) In some embodiments of any of the methods of A1-A7, the expanded pattern data is comprised by a corpus upon which the LM is generated.

(A9) In some embodiments of any of the methods of A1-A8, the LM comprises a first LM (e.g., 216) and a second LM (e.g., 224), wherein the first LM comprises an n-gram model, wherein the second LM comprises a neural network.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A9).

(C1) In yet another aspect, a non-transitory computer-readable storage medium includes instructions that, when executed by a processor (e.g., 104) of a computing system (e.g., 102), cause the processor to perform any of the methods described herein (e.g., any of A1-A9).

(D1) In another aspect, some embodiments include a method executed by a computing system (e.g., 102) that includes a processor (e.g., 104) and memory (e.g., 106). The method includes obtaining features that have been extracted from an acoustic signal, where the acoustic signal includes spoken words uttered by a user (e.g., 118), and where the spoken words include a user query that is to be transmitted to a search engine (e.g., 140). The method further includes performing automatic speech recognition (ASR) based upon the features and a language model (LM) (e.g., 114) generated based upon expanded pattern data. The expanded pattern data includes a name of an entity and a search term.

The entity belongs to a segment identified in a knowledge base (e.g., 208), the segment categorizing the entity. The method additionally includes identifying a sequence of words for the user query based upon results of the ASR. The method also includes outputting computer-readable text to the search engine, the text including the sequence of words.

(D2) In some embodiments of the method of D1, the LM includes a plurality of first pass LMs (e.g., 216) and a second pass LM (e.g., 224), where the plurality of first pass LMs output a list of word sequences and probabilities of the word sequences, and where the second pass LM revises the probabilities of the word sequences.

(D3) In some embodiments of the method of D2, the plurality of first pass LMs includes a unified language model (ULM) (e.g., 218), a time sensitive language model (TSLM) (e.g., 220), and a class-based language model (e.g., 222).

(D4) In some embodiments of any of the methods of D1-D3, the search term has been included in queries for entities, where each of the entities belongs to the segment.

(D5) In some embodiments of any of the methods of D1-D4, the acoustic signal originates from a computing device (e.g., 116) operated by the user, and further where the search engine returns a search result to the computing device operated by the user, where the search result is based upon the text.

(D6) In some embodiments of any of the methods of D1-D5, the expanded pattern data is generated based upon a pattern that is identified based upon the knowledge base and search engine logs (e.g., 204).

(D7) In some embodiments of any of the methods of D1-D6, the LM is an n-gram model and the expanded pattern data forms a corpus upon which the n-gram model is generated.

(D8) In some embodiments of the method of D7, the n-gram model is additionally generated based upon data from third-party websites.

(E1) In another aspect, a computing system (e.g., 102) includes a processor (e.g., 104) and memory (e.g., 106). The memory stores instructions that, when executed by the processor, cause the processor to perform any of the methods described herein (e.g., any of D1-D8).

(F1) In yet another aspect, a non-transitory computer-readable storage medium includes instructions that, when executed by a processor (e.g., 104) of a computing system (e.g., 102), cause the processor to perform any of the methods described herein (e.g., any of D1-D8).

(G1) In another aspect, some embodiments include a method executed by a computing system (e.g., 102) that includes a processor (e.g., 104) and memory (e.g., 106). The method includes obtaining features that have been extracted from an acoustic signal, where the acoustic signal is generated by way of a microphone (e.g., 130) of a computing device (e.g., 116) operated by a user (e.g., 118), and further where the acoustic signal includes spoken words uttered by the user. The method further includes performing automatic speech recognition (ASR) based upon the features and a language model (LM) (e.g., 114) generated based upon expanded pattern data, the expanded pattern data including a name of an entity and a search term, where the entity belongs to a segment identified in a knowledge base (e.g., 208), the segment categorizing the entity. The method additionally includes identifying a sequence of words based upon results of the ASR. The method also includes outputting computer-readable text to a search engine (e.g., 140), the text including the sequence of words.

(G2) In some embodiments of the method of G1, the search term has been included in queries for entities, where each of the entities belongs to the segment, where the queries originate from a plurality of geo-linguistic locales, and where a geo-linguistic locale includes a geographic region and a language used by individuals in the geographic region.

(G3) In some embodiments of any of the methods of G1-G2, a personal assistant service causes the features to be obtained by the computing system.

(H1) In another aspect, a computing system (e.g., 102) includes a processor (e.g., 104) and memory (e.g., 106). The memory stores instructions that, when executed by the processor, causes the processor to perform any of the methods described herein (e.g., any of G1-G3).

(I1) In yet another aspect, a non-transitory computer-readable storage medium includes instructions that, when executed by a processor (e.g., 104) of a computing system (e.g., 102), cause the processor to perform any of the methods described herein (e.g., any of G1-G3).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
    a processor; and
    memory storing instructions that, when executed by the processor, cause the processor to perform acts comprising:
        obtaining features that have been extracted from an acoustic signal, wherein the acoustic signal is based upon spoken words uttered by a user, and further wherein the spoken words are indicative of a query that is to be transmitted to a search engine;

performing automatic speech recognition (ASR) based upon the features and a language model (LM), wherein the LM comprises a plurality of first pass LMs and a second pass LM, wherein the plurality of first pass LMs output a list of word sequences and probabilities of the word sequences, wherein the second pass LM revises the probabilities of the word sequences, and wherein the LM has been generated based upon expanded pattern data, the expanded pattern data comprising a name of an entity and a search term, wherein the entity belongs to a segment identified in a knowledge base, the segment categorizing the entity;

identifying a most likely sequence of words corresponding to the features based upon results of the ASR; and outputting computer-readable text to the search engine, the text comprising the most likely sequence of words.

2. The computing system of claim 1, wherein the plurality of first pass LMs comprises:
a unified language model (ULM);
a time sensitive language model (TSLM); and
a class-based language model.

3. The computing system of claim 1, wherein the second pass LM comprises a neural network.

4. The computing system of claim 1, wherein the expanded pattern data is generated based upon a pattern that is identified based upon the knowledge base and search engine logs.

5. The computing system of claim 1, wherein the LM comprises an n-gram model, and further wherein the expanded pattern data forms a corpus upon which the n-gram model is generated.

6. The computing system of claim 5, wherein the n-gram model is additionally generated based upon data from third-party websites.

7. The computing system of claim 1, wherein the acoustic signal originates from a computing device operated by the user, and further wherein the search engine returns a search result to the computing device operated by the user, wherein the search result is based upon the text.

8. The computing system of claim 1, wherein the search term has been included in queries for entities, where each of the entities belongs to the segment.

9. A method executed by a processor of a computing system, the method comprising:
obtaining features that have been extracted from an acoustic signal, wherein the acoustic signal is based upon spoken words uttered by a user;
performing automatic speech recognition (ASR) based upon the features and a language model (LM), wherein the LM comprises a plurality of first pass LMs and a second pass LM, wherein the plurality of first pass LMs output a list of word sequences and probabilities of the word sequences, wherein the second pass LM revises the probabilities of the word sequences, and wherein the LM has been generated based upon expanded pattern data, the expanded pattern data comprising a name of an entity and a search term, wherein the entity belongs to a segment identified in a knowledge base, the segment categorizing the entity, and further wherein the search term has been included in queries for entities, where each of the entities belongs to the segment;
identifying a most likely sequence of words corresponding to the features based upon results of the ASR; and
transmitting computer-readable text to a search engine, the text comprising the most likely sequence of words.

10. The method of claim 9, wherein the expanded pattern data is generated by:
selecting a search engine log stored in search engine logs, wherein the search engine log comprises:
a query that includes the name of the entity and at least one search term;
an identifier for a geo-linguistic locale in which the query originated;
a uniform resource locator (URL) that was selected in results for the query; and
a selection count, where the selection count is a number of times the URL was selected by users in the geo-linguistic locale for the query;
identifying an entry in the knowledge base based upon the URL included in the search engine log, wherein the entry in the knowledge base comprises:
a unique identifier for the entity;
the name of the entity;
the segment of the entity which categorizes the entity;
a type of the entity which categorizes the entity within the segment; and
a second URL from which the entry in the knowledge base was generated,
wherein the URL and the second URL are identical; and
generating a query stream based upon the search engine log and the entry in the knowledge base, wherein an entry in the query stream comprises:
the query;
the identifier for the geo-linguistic locale;
the unique identifier for the entity;
the name of the entity;
the segment of the entity;
the type of the entity; and
the selection count.

11. The method of claim 10, wherein the expanded pattern data is further generated by:
generating an entity stream for the entity based upon the query stream, wherein an entry in the entity stream comprises:
the identifier for the geo-linguistic locale;
the unique identifier for the entity;
the name of the entity;
the segment of the entity;
the type of the entity; and
an entity impression, wherein the entity impression is computed by:
selecting entries in the query stream that have the unique identifier for the entity and the identifier for the geo-linguistic locale; and
summing respective selection counts for each of the entries in the query stream.

12. The method of claim 11, wherein the expanded pattern data is further generated by:
generating a pattern stream based upon the query stream, wherein an entry in the pattern stream comprises:
the identifier for the geo-linguistic locale;
the segment of the entity;
a pattern associated with entity;
the type of the entity; and
a pattern impression, wherein the pattern impression is indicative of a number of times the pattern was observed in queries associated with the segment.

13. The method of claim 12, wherein the pattern associated with the entity is determined by:
extracting the query from the entry in the query stream;

identifying the entity in the query based upon the name of the entity included in the entry in the query stream; and replacing the name of the entity in the query with a placeholder, wherein the pattern comprises the placeholder and the at least one search term included in the query.

14. The method of claim 13, wherein the expanded pattern data is further generated by:

selecting the name of the entity and the segment of the entity in the entry in the entity stream;

selecting the entry in the pattern stream based upon the segment of the entity included in the entity stream matching the segment of the entity included in the entry in the pattern stream;

selecting the pattern in the entry in the pattern stream based upon the segment of the entity included in the entity stream; and replacing the placeholder in the pattern with the name of the entity in the entity stream, thereby generating the expanded pattern data.

15. The method of claim 13, wherein the expanded pattern data is further generated by:

selecting the name of the entity and the type of the entity in the entry in the entity stream;

selecting the entry in the pattern stream based upon the type of the entity included in the entity stream matching the type of the entity included in the entry in the pattern stream;

selecting the pattern in the entry in the pattern stream based upon the type of the entity included in the entity stream; and replacing the placeholder in the pattern with the name of the entity in the entity stream, thereby generating the expanded pattern data.

16. The method of claim 9, wherein the expanded pattern data is comprised by a corpus upon which the LM is generated.

17. The method of claim 16, the plurality of first pass LMs comprise an n-gram model and the second pass LM comprises a transformer model.

18. A non-transitory computer-readable medium comprising instructions that, when executed by a processor of a computing system, cause the processor to perform acts comprising:

obtaining features that have been extracted from an acoustic signal, wherein the acoustic signal is generated by way of a microphone of a computing device operated by a user, and further wherein the acoustic signal is based upon spoken words uttered by the user;

performing automatic speech recognition (ASR) based upon the features and a language model (LM), wherein the LM comprises a plurality of first pass LMs and a second pass LM, wherein the plurality of first pass LMs output a list of word sequences and probabilities of the word sequences, wherein the second pass LM revises the probabilities of the word sequences, and wherein the LM has been generated based upon expanded pattern data, the expanded pattern data comprising a name of an entity and a search term, wherein the entity belongs to a segment identified in a knowledge base, the segment categorizing the entity;

identifying a most likely sequence of words corresponding to the features based upon results of the ASR; and outputting computer-readable text to a search engine, the text comprising the most likely sequence of words.

19. The non-transitory computer-readable storage medium of claim 18, wherein a personal assistant service causes the features to be obtained by the computing system.

20. The non-transitory computer-readable storage medium of claim 18, wherein the search term has been included in queries for entities, where each of the entities belongs to the segment, wherein the queries originate from a plurality of geo-linguistic locales, wherein a geo-linguistic locale comprises a geographic region and a language used by individuals in the geographic region.

* * * * *